UNITED STATES PATENT OFFICE.

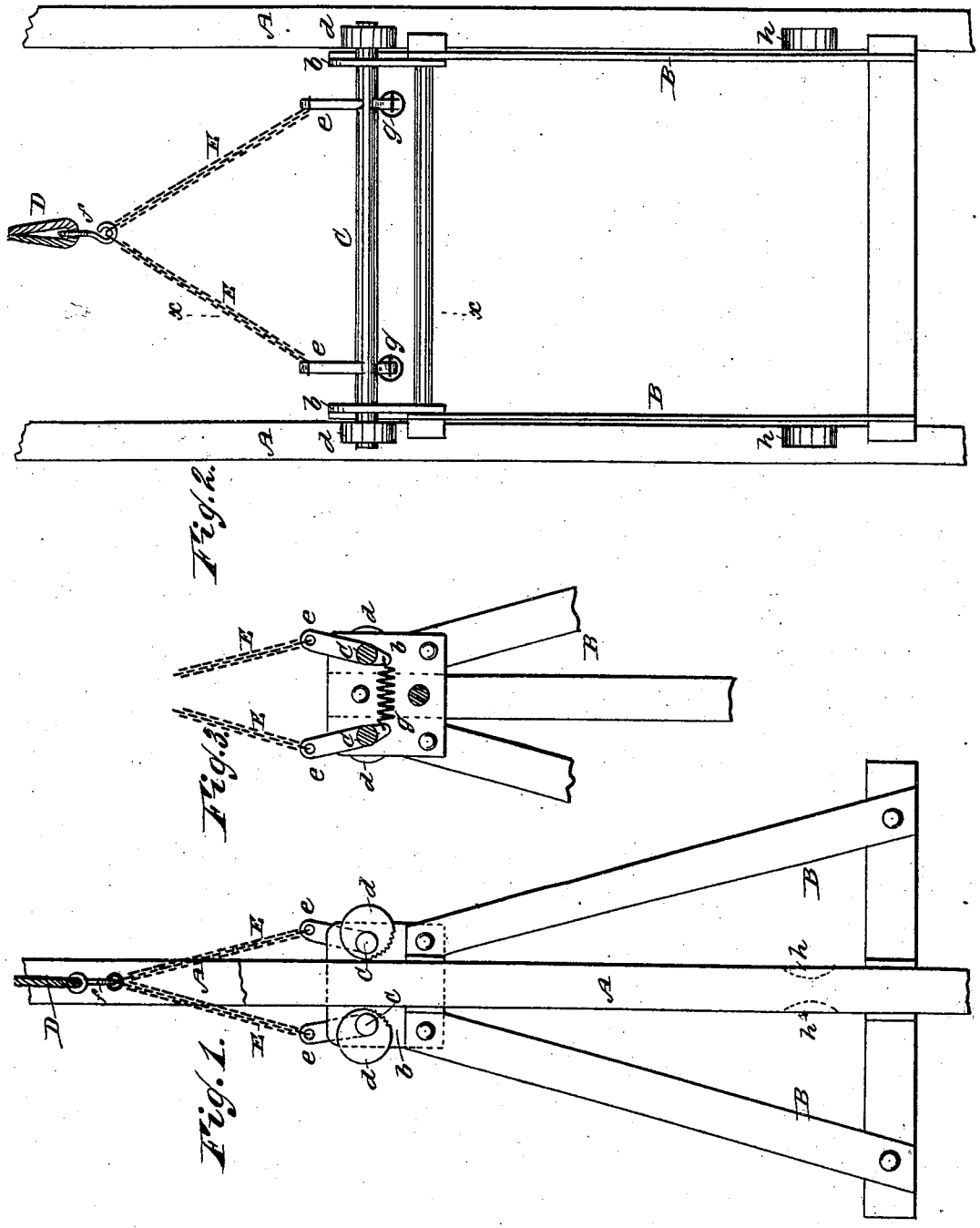

WILLIAM GODDARD, OF CHESTER, ILLINOIS.

ELEVATOR.

SPECIFICATION forming part of Letters Patent No. 275,037, dated April 3, 1883.

Application filed January 27, 1883. (No model.)

*To all whom it may concern:*

Be it known that I, WILLIAM GODDARD, of Chester, in the county of Randolph and State of Illinois, have invented certain new and useful Improvements in Elevators, of which the following is a full, clear, and exact description.

This invention relates to the suspension of the cage of an elevator by or through the instrumentality of cams or cam-levers which are subject to spring control, and so connected with the hoisting-rope or chain and arranged in relation with guides or uprights that in case of the breakage of the hoisting-rope the cams will be thrown into grip or hold on the uprights to keep the cage from falling; and my invention consists in certain novel combinations and arrangements of said means and devices immediately connected therewith whereby greater simplicity and efficiency are obtained, substantially as hereinafter described.

Reference is to be had to the accompanying drawings, forming a part of this specification, in which similar letters of reference indicate corresponding parts in all the figures.

Figures 1 and 2 are side elevations, in planes at right angles with each other, of an elevator in part having my invention applied; and Fig. 3, a vertical section in part on the line $x\ x$ in Fig. 2.

A A indicate two opposite side fixed uprights or posts, which may serve as guides for the cage B. Firmly secured to the upper portions of the frame of the cage B are opposite side head-pieces, $b\ b$, each of which is a solid metal plate, and which serve in a very strong and efficient manner to resist the strain of the automatic gripping device on the uprights A A in case of the breakage of the hoisting-rope of the cage, as hereinbefore referred to. These said head-pieces form bearings for the parallel cross-shafts C C of the gripping devices. Upon the opposite ends of these shafts are the cams or cam-levers $d\ d$, which, as in other safety contrivances of like kind, may be serrated on those portions of their peripheries or outer surfaces that in case of breakage of the hoisting-rope grip or take hold on opposite side edges of each upright A A. Each of these shafts C C has projecting upwardly from it, near either end, arms or levers $e\ e$, which are connected on opposite sides of the elevator—that is, each two of said arms on the two cross-shafts that are in the same transverse plane relatively to said shafts—with a central link or hook, $f$, attached to the hoisting-rope D or swivel thereof. This connection is established by means of opposite side suspension slings or chains, E E, and by it the cage is effectually balanced. The shafts C C are connected on opposite sides of their axes to the arms $e\ e$, and on opposite sides of the cage by springs $g\ g$, which, as thus arranged, are kept distended so long as the cage B is suspended from the hoisting-rope, but which, on breakage of the hoisting-rope, collapse and exert their tension to turn the shafts C C and induce or produce grip of the cams $d\ d$ on the posts A A to hold the cage from falling. If desired, the shafts C C may be connected on the reverse sides of their axes by springs, which, instead of being distended when the cage is suspended from the hoisting-rope, are compressed and relax to produce the grip on the posts; or both forms of springs may be used. A single description or arrangement of springs, however, such as shown, it is believed will be found all-sufficient.

By the arrangement and construction of parts as shown it will be observed that no matter how much weight is put upon the cage the cross-shafts C C are limited in their turning motion to a straight position of the levers $e\ e$ in line with the chains E E, attached to them, thus relieving the springs $g\ g$ of any further strain, which protects them from breakage. By employing two or more springs, too, and making each one sufficient to do the whole work, the safety action of the device will not be destroyed by the breakage of one of them. To relieve the springs of strain when the cage is lowered and at rest, recesses $h\ h$ are formed in opposite sides of the lower portions of the uprights A A, into which the cams $d\ d$ enter by the action of the springs $g\ g$. As arranged and constructed, the safety device becomes a part of the cage itself, and not a mere attachment. Its action, too, is a direct one. The lateral springs $g\ g$ will be always in sight of the operator, and may be readily put on or taken off, as required; also, being arranged overhead, are not liable to come in contact with any person or body on the cage, as a single central spring mounted on the platform of the cage to operate the cams, as in other arrangements, is apt to do.

I am aware that it is not new to combine jointed arms, suspending-rods, ways, bell-crank levers, links, eyebolts, rods, eccentrics, and springs with the suspension-chains; but

What I claim as new and of my invention is—

1. The head-pieces $b\,b$, formed of solid metal plate, and arranged opposite to each other on the frame to form bearings for the cross-shafts of the gripping devices, guides for the cage, and to take the strain, as described.

2. The fixed uprights A A, provided with recesses $h\,h$ in their opposite sides, in combination with the cage B, the cam-shafts C C and their attached cams $d\,d$, and the springs $g\,g$, substantially as and for the purpose herein set forth.

WILLIAM GODDARD.

Witnesses:
RALPH E. SPRIGG,
J. H. LINDSEY.